United States Patent [19]

Bissett

[11] Patent Number: 5,130,097
[45] Date of Patent: Jul. 14, 1992

[54] APPARATUS FOR HOT-GAS DESULFURIZATION OF FUEL GASES

[75] Inventor: Larry A. Bissett, Morgantown, W. Va.

[73] Assignee: The United States of America as represented by the Department of Energy, Washington, D.C.

[21] Appl. No.: 560,666

[22] Filed: Jul. 31, 1990

[51] Int. Cl.$^5$ .................. B01J 19/00; F27B 15/00
[52] U.S. Cl. ........................ 422/143; 422/144; 422/192; 422/177; 423/244
[58] Field of Search .......... 422/144, 143, 190, 145, 422/192, 177, 171, 170, 216; 423/244; 208/113, 120, 91

[56] References Cited

U.S. PATENT DOCUMENTS

| 4,198,388 | 4/1980 | Laslo et al. | 422/170 |
|---|---|---|---|
| 4,255,166 | 3/1981 | Gernand et al. | 422/216 |
| 4,321,240 | 3/1982 | Robinson | 422/144 |
| 4,600,561 | 7/1986 | Frei | 422/170 |
| 4,609,537 | 9/1986 | Tolpin et al. | 208/113 |
| 4,831,204 | 5/1989 | Kushnerick et al. | 422/190 |

Primary Examiner—James C. Housel
Assistant Examiner—Long V. Le
Attorney, Agent, or Firm—David E. Breeden; Stephen D. Hamel; William R. Moser

[57] ABSTRACT

An apparatus for removing sulfur values from a hot fuel gas stream in a fluidized bed contactor containing particulate sorbent material by employing a riser tube regeneration arrangement. Sulfur-laden sorbent is continuously removed from the fluidized bed through a stand pipe to the riser tube and is rapidly regenerated in the riser tube during transport of the sorbent therethrough by employing an oxygen-containing sorbent regenerating gas stream. The riser tube extends from a location below the fluidized bed to an elevation above the fluidized bed where a gas-solid separating mechanism is utilized to separate the regenerated particulate sorbent from the regeneration gases and reaction gases so that the regenerated sorbent can be returned to the fluidized bed for reuse.

10 Claims, 3 Drawing Sheets

APPARATUS FOR HOT-GAS DESULFURIZATION OF FUEL GASES

BACKGROUND OF THE INVENTION

The present invention relates generally to the desulfurization of fuel gases by the removal of sulfur species from a hot fuel gas stream produced by the gasification of a carbonaceous fuel. More particularly, the present invention relates to the removal of sulfur species from such hot fuel gas by using a fluidized bed of particulate sorbent wherein sulfur-laden sorbent in the fluidized bed is continuously removed from the fluidized bed, regenerated in a riser tube with an oxygen-containing gas and returned to the fluidized bed.

The gasification of carbonaceous fuels, especially coal, in an oxygen deficient or reducing atmosphere is frequently utilized to produce hot, fuel-rich fuel gases which provide a combustible driving fluid for various types of prime movers and as a combustible fuel useful in other heat utilizing applications.

A significant problem attendant with the use of fuel gas produced in the gasifiers is due to the presence of sulfur species, primarily hydrogen sulfide, carbonyl sulfide, and carbon disulfide, in the fuel gas which are environmental pollutants and cause deleterious build-ups in equipment and contaminate processes capable of utilizing the fuel gas. The removal of sufficient sulfur species from the fuel gas to provide the latter with acceptable sulfur levels has been successfully accomplished by utilizing various sulfur sorbents such as calcium compounds in the gasifier and/or particulate sorbent-containing beds contactable by the fuel gas discharged from the gasifier.

The desulfurization of hot fuel-rich or oxygen-deficient fuel gases derived from the gasification of sulfur-bearing fuels by utilizing particulate sorbent-containing beds has been found to be particularly desirable because of the high sorbing efficiency of the sorbent and the fact that many of the presently known sorbents useful as bed material can be readily regenerated. Solid sorbents in particulate form found to be satisfactory as sulfur sorbents in fixed-, moving-, and fluidized-bed contactors or absorbers for removing sulfur species and compounds from hot fuel gas include iron oxide, zinc ferrite, zinc titanate, zinc oxide, and in combinations thereof. These sorbents may also be satisfactorily supported on bases such as alumina or zeolites.

As previously practiced, the regeneration of sulfur-bearing particulate sorbents was achieved by taking the contactor containing the bed of sorbent off line or by removing the sorbent from the contactor to a separate regeneration vessel. The regenerating sorbent in the off line contactor or in the separate regeneration vessel is achieved by passing a hot oxygen-containing regeneration gas through the hot sorbent for effecting an exothermic reaction between the sulfur compounds absorbed or captured by the sorbent and the oxygen in the gas to form sulfur oxides, primarily sulfur dioxide and sulfur trioxide, which are entrained in the regeneration gas. After regeneration the contactor is put back on line or the regenerated sorbent is returned from the separate vessel to the contactor for subsequent capture of sulfur species from the hot fuel gas. The sulfur oxide laden gas resulting from regeneration of the sorbent is readily treated for producing elemental sulfur or disposable, environmentally stable sulfur compounds.

SUMMARY OF THE INVENTION

A principal objective or aim of the present invention is to provide a desulfurization system and method for removing sulfur values or species from hot fuel gas derived from the gasification of sulfur-containing carbonaceous fuels as an improvement over the previous techniques and apparatus utilized for regenerating particulate sulfur sorbents such as achieved by taking the contactor off line or regenerating the sorbent in a separate vessel. This objective is accomplished in a continuous on-line sulfur removing system which generally comprises a vertically oriented housing means with grid means therein for supporting a bed of particulate sulfur sorbent intermediate lower and upper ends of the housing means. The bed of particulate sorbent is contactable by a stream of hot sulfur-bearing fuel gas entering the housing means through inlet means underlying the bed for fluidizing the bed with sulfur species in fuel gas reacting with the fluidized sorbent for capture thereby. Vertically oriented conduit means or a stand pipe contacts the fluidized sorbent bed for receiving and conveying sulfur-bearing sorbent therefrom. Further conduit means or a riser tube is in registry with the vertically oriented conduit means at a location underlying the fluidized bed for receiving the sulfur-bearing sorbent conveyed therein. A suitable means or supply line is coupled to the further conduit means for introducing thereinto a stream of oxygen-containing gas for displacing the sulfur-bearing sorbent upwardly through the further conduit means to a preselected location. The oxygen in the oxygen-containing gas contacts the sulfur-bearing sorbent and reacts with the sorbed sulfur species therein during the displacement thereof through the further conduit means for converting sulfer species contained by the sorbent gaseous sulfur oxides while regenerating the sorbent. Separating means such as a cyclone is coupled to said further conduit means at said location for separating particulate sorbent from residual oxygen-containing gas supporting said sulfur oxides. Still further conduit means or a dipleg is in registry with both the separating means and the fluidized bed for conveying the separated regenerated sorbent from the separating means into the fluidized bed.

The fuel gas entering the housing means is at a temperature in the range of about 800° to 1500° F., and a pressure in the range of about 0 to 2000 psig. The stream of oxygen-containing gas contactable with the sulfur-containing sorbent in the further conduit means or the riser tube is at a temperature in the range of about 600° to 1400° F. and at a pressure slightly greater than that of the fuel gas in the housing means. The separated regenerated sorbent is conveyed to the fluidized bed through the still further conduit means at a temperature in the range of about 1100° to 1500° F.

Other and further objects of the present invention will become obvious upon an understanding of the illustrative embodiments about to be described or will be indicated in the appended claims and various advantages not referred to herein will occur to one skilled in the art upon employment of the invention in practice.

Figure 1:
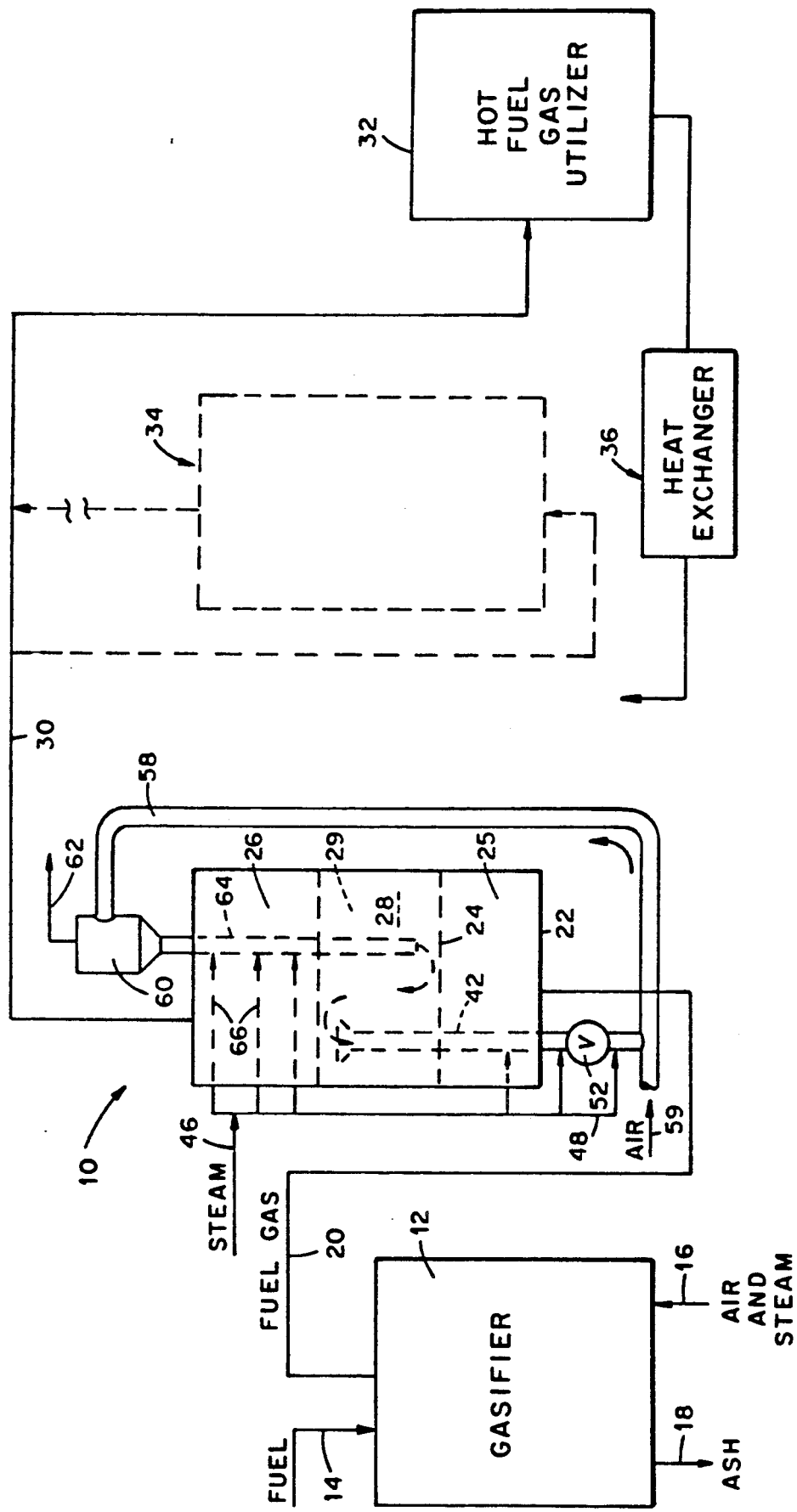
FIG. 1 is a schematic view illustrating a coal gasification arrangement in which hot fuel gas produced in a gasifier is desulfurized in the system of the present invention and conveyed to an apparatus or process utilizing the hot fuel gas.

Preferred embodiments of the invention have been chosen for the purpose of illustration and description. The preferred embodiments are not intended to be exhaustive nor to limit the invention to the precise forms disclosed. They ar chosen and described in order to best explain the principles of the invention and their application and practical use to thereby enable others skilled in the art to best utilize the invention in various embodiments and modifications that are best adapted to the particular use contemplated.

DETAILED DESCRIPTION OF THE INVENTION

As generally described above, the present invention is directed to an apparatus or system and method for continuously removing sulfur species. The present invention provides for the continuous regeneration of the particulate sorbent utilized for the removal of the sulfur species. The sulfur species are removed from a stream of fuel gas generated by the gasification of a sulfur-bearing fuel at a temperature in the range of about 800° to 1500° F. and a pressure in the range of about 0 to 2000 psig. The stream of fuel gas is conveyed through a bed of particulate sulfur sorbent for contact therewith to capture and absorb therein sulfur species from said fuel gas. Sulfur-bearing sorbent is removed from the bed and contacted with a confined stream of oxygen-containing gas for conveying the contacted sulfur-bearing sorbent upwardly while converting sulfur-species captured and absorbed on the removed sorbent to gaseous sulfur oxides while regenerating the removed sorbent. The regenerated sorbent is separated from the gaseous sulfur oxides and residual oxygen-containing gas and returned the fluidized bed.

The confined stream of oxygen-containing gas is at a temperature in the range of about 600° to 1400° F. and a pressure slightly greater than that of the fuel gas. The concentration of oxygen in the stream of oxygen-containing gas is in the range of about 2 to 21 volume percent and the amount of oxygen in the stream of oxygen-containing gas relative to the amount of sulfur-bearing sorbent is in the range of about 1 to 50 times the stoichiometric quantity for sorbent regeneration. The removed sulfur-bearing sorbent is contacted by the oxygen-containing gas for a sufficient duration to convert substantially all of the sulfur species captured and absorbed on the removed sorbent to sulfur oxides.

The present invention is particularly suitable for use in integrated gasification combined cycle systems wherein the gasifier is utilized to provide a stream of hot fuel gas directly to a gas turbine combustor. In order to satisfy environmental emission standards as well as to protect the power utilizing devices such as turbines from damage due to the presence of sulfur compounds in the fuel gas, the sulfur values or species in the hot fuel gas are substantially removed from the fuel gas in a fluidized bed of particulate sorbent and the particulate sorbent is continuously regenerated without undergoing any significant drop in the temperature of the fuel gas or in the pressure of the fuel gas discharged from the gasifier so as to significantly increase the overall efficiency of the power utilizing system.

A simple integrated combined cycle arrangement is generally shown in FIG. 1, however, it is to be understood that the subject invention can be used in other gasification processes or arrangements such as providing essentially sulfur-free hot fuel gas for use in chemical reactions and process or system heating. With reference to FIG. 1, the sulfur removing apparatus, as generally shown at 10, includes a gasifier 12 in which a carbonaceous fuel containing sulfur species or compounds, such as present in coal, oil, biomass, or other combustible carbonaceous materials ia gasified in the presence of a reducing atmosphere to produce a fuel-rich product gas or fuel gas. The fuel is introduced into the gasifier through line 14 while air and steam is introduced through line 16. It should be pointed out that oxygen could be used in place of air. Solid waste material resulting from the gasification of the fuel is discharged from the gasifier 12 through ash line 18. The fuel gas generated within the gasifier is discharged from the top of gasifier 12 through line 20 and is at a temperature of a range from about 800° to 2500° F., and at a pressure of about 0 to 2000 psig. At temperatures above about 1500° F., this hot fuel gas is cooled either directly or indirectly to a temperature range of about 800° to 1500° F. and is conveyed by line 20 into a vertically oriented sulfur removing housing 22. For example, the hot fuel gas in line 20 may be cooled by direct injection of water into the gas stream or by indirect heat exchange. The housing 22 contains a horizontally disposed grid or distributor 24 intermediate lower and upper chambers 25 and 26 for supporting a bed 28 of regenerable particulate sulfur sorbent such as described above. The hot gas in line 20 enters the housing 22 via the lower chamber 25 and fluidizes the bed 28 of particulate sorbent 29. So that the necessary degree of sulfur removal is obtained, the fluidized bed 28 must contain sufficient sorbent 29 to provide adequate contact between the sulfur species in the hot fuel gas and the particulate sorbent 29 making up the bed. The hot desulfurized fuel gases emerging from the top of the fluidized bed 28 pass through the upper chamber 26 in the housing 22 through line 30 to be further desulfurized or delivered into fuel gas utilizer 32. In order to assure that the bed 28 of particulate sorbent 29 is sufficiently fluidizable and provides a satisfactory level of sulfur capture, a sorbent particle size in a range of about 50 to 1000 microns is preferred.

To assure that sufficient sulfur is removed from the hot fuel gases prior to the use thereof, additional sulfur removing and sorbent regenerating units constructed in accordance with the present invention and as generally shown at 34 may be disposed in a serial arrangement prior to the introduction of the fuel gas into the hot fuel gas utilizer 32. The fuel gas after being used in the hot fuel gas utilizer 32 may be passed through a heat exchanger generally shown at 36 for extracting residual heat values therefrom.

Figure 2:
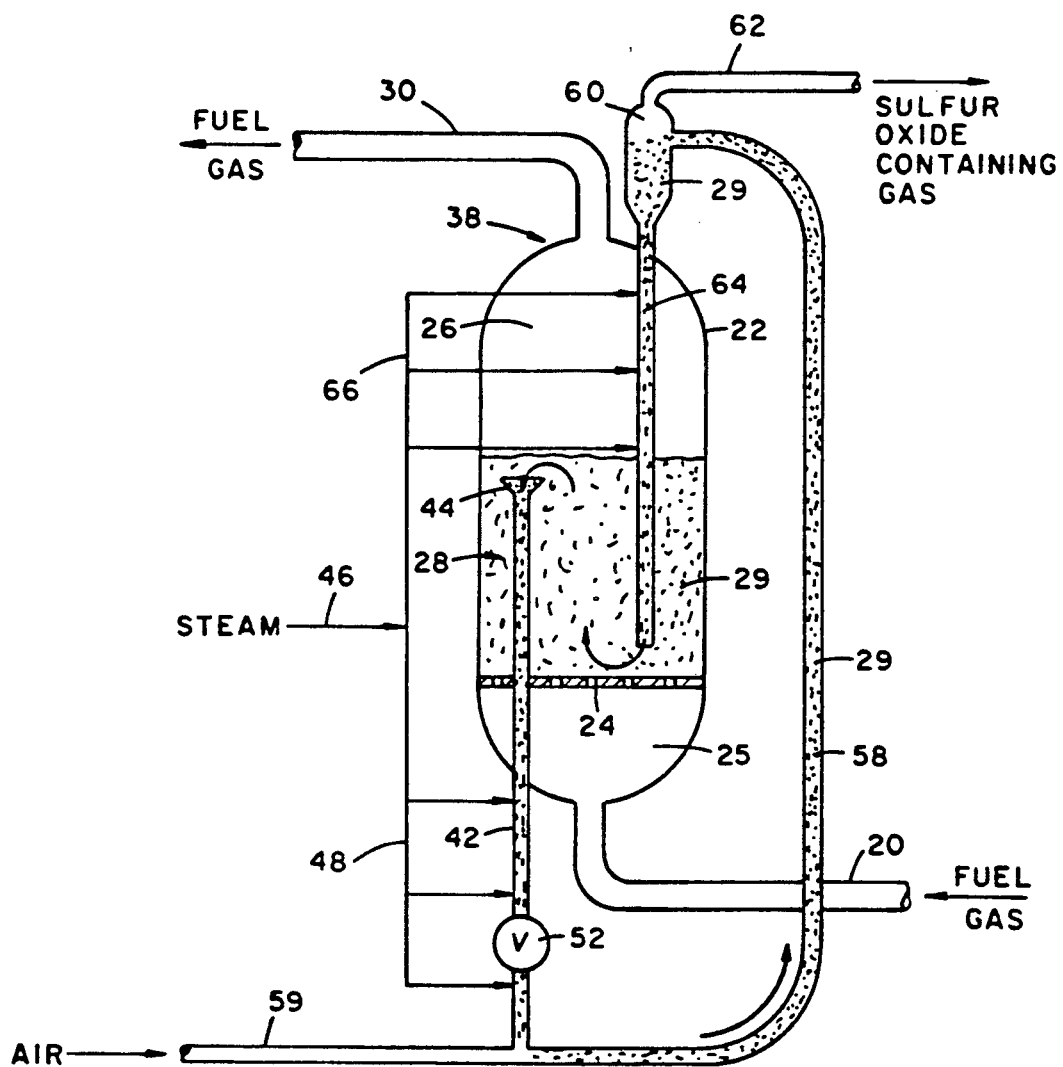
FIG. 2 is a schematic view showing an embodiment of the fuel gas desulfurizing and sorbent regenerating system of the present invention as useable in a gasification arrangement such as illustrated in FIG. 1.
Figure 3:
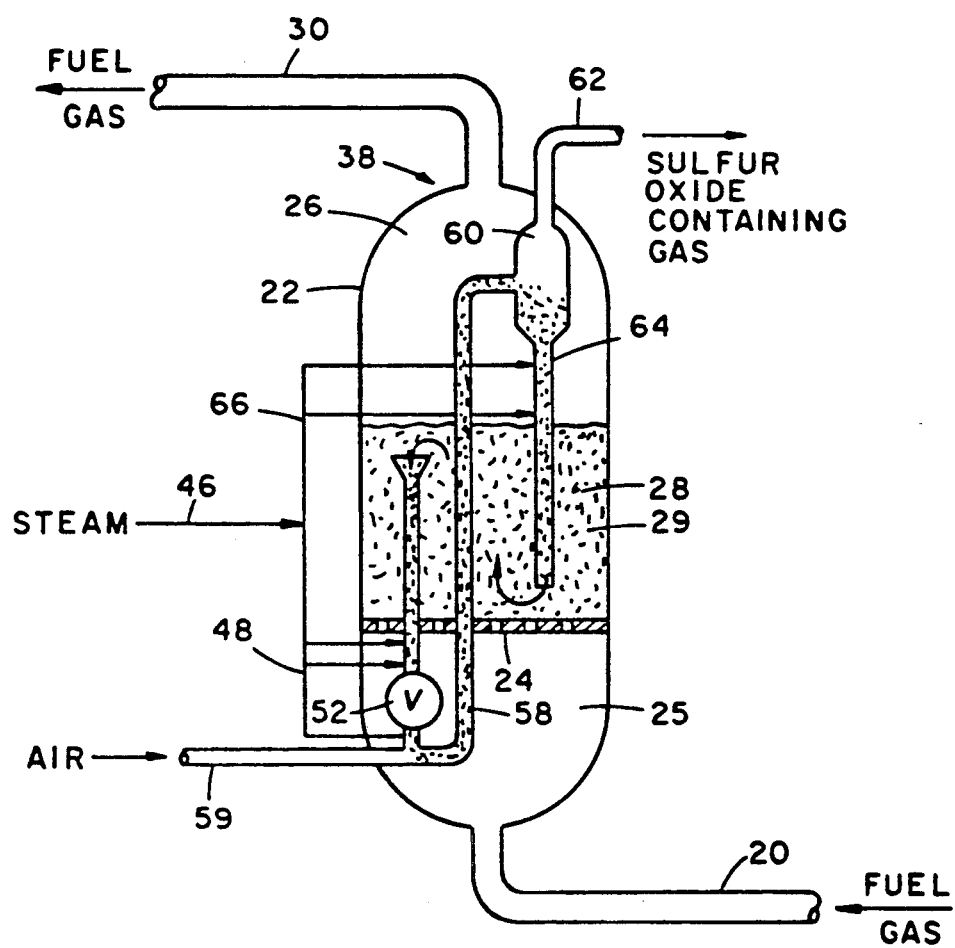
FIG. 3 is a schematic view showing a further embodiment of the fuel gas desulfurizing and sulfur regenerating apparatus with the sulfur regenerating arrangement contained within the converter vessel or housing supporting the fluidized bed of particulate sorbent.

With the sulfur removing and sorbent regenerating system of the present invention as generally shown at 38 in FIGS. 2 and 3, the hot fuel gas from the coal gasifier 12 is introduced into sorbent containing vessel or housing 22 and is distributed across the internal cross-sectional area of the housing 22 by the grid 24 so as to cause the bed 28 of sulfur sorbent material 29 to become sufficiently fluidized. As the hot fuel gas flows upwardly through the fluidized sorbent bed 28, substantially all of the sulfur values or species in the fuel gas, which are primarily in the form of hydrogen sulfide, carbonyl sulfide, and carbon disulfide because of the reducing nature of the fuel gas, are removed from the fuel gas by being captured or absorbed through chemical reactions with the particulate sorbent forming the fluidized bed. The sorbent can only absorb a certain quantity of sulfur which, theoretically, is up to about the stoichiometric limit for the sorbent before the sorbent loses its activity for any significant reaction with the sulfur so as to become ineffective. Thus as the sulfur species are removed from the fuel gas by the particulate sorbent 29, the sulfur content of the sorbent 29 increases to a level where the sorbent is considered to be substantially non-effective or a sulfided sorbent. In accordance with the present invention sulfided sorbent is continuously removed from the fluidized bed, regenerated to restore its ability for sorbing sulfur values, and then returned to the fluidized bed for subsequent use, all without any significant reduction in fuel gas temperature or pressure.

With reference to the embodiment illustrated in FIG. 2, the sulfur removing and sorbent regenerating system shown at 38 comprises a vertically oriented elongated housing 22 which contains the fluidized bed 28 supported on the grid or distributor 24. With the sulfur species in hot fuel gas reacting with and being captured or sorbed by particulate sorbent 29 in the bed 28, sulfided sorbent is removed from the fluidized bed 28 by gravitational flow through a conduit or stand pipe 42 which is preferably vertically oriented and extends to a location at an elevation below the fluidized bed 28. As shown in FIG. 2, the stand pipe 42 extends through the lower end or base of the housing 22 to a location underlying the housing 22. The top or upper end of the stand pipe 42 is positioned within the fluidized bed 28 at any suitable location wherein the flow of sulfided sorbent 29 into the stand pipe 42 is efficiently achieved. For example, the upper end of the stand pipe 42 may be located in an underflow location near the bottom of the bed 28 adjacent to the grid 24, in an overflow location near the top or upper surface of the bed 28, or at a location therebetween. In order to assure that an adequate amount of sulfided particulate sorbent 29 enters the stand pipe 42, the stand pipe 42 may be provided with an outwardly flared upper end 44.

To assure that any fuel gas entrained by the sulfided sorbent descending through the stand pipe 42 is returned to the fluidized bed 28 prior to contact with the oxygen-containing regeneration gas as will be described below, a stream of a suitable gas such as steam or a steam and an inert gas such as nitrogen is introduced through line 46 at vertically spaced apart locations such as provided by a manifold arrangement generally indicated at 48 along the length of the stand pipe 42. This stream of gas from line 46 rises in the stand pipe 42 to strip entrained fuel gas from the sorbent 29 and return the fuel gas to the fluidized bed 28. The gas entering the stand pipe 42 through line 46 is at essentially the same pressure as the hot fuel gas in the housing 22. The rate of flow of the sulfided sorbent 29 through the stand pipe 42 and the circulation rate of the sorbent 29 through the sorbent regeneration system can be readily regulated by using a suitable control valve 52 at a location on the stand pipe 42 near the bottom or lower end thereof. This valve 52 may be a control valve such as conventionally used in catalytic cracking units of petroleum refineries.

At the lower end of the stand pipe 42, the sulfided sorbent 29 which is at a temperature essentially the same as the temperature of the fuel gas in the fluidized bed 28, and at a slightly higher pressure due to the head of solids in stand pipe 42. The sulfided sorbent 29 enters a conduit or riser tube 58 which is coupled to the bottom of the stand pipe 42. As shown in FIGS. 2 and 3 this riser tube 58 extends upwardly from a location or elevation lower than that of the fluidized bed 28 to a location at an elevation higher than the upper surface of the fluidized bed 28. The lower end of the riser tube 58 is coupled to a supply (not shown) of oxygen-containing sorbent regeneration gas which is introduced into the riser tube 58 through line 59 for entraining the sulfided sorbent 29 descending into the riser tube 58 from the stand pipe 42 and transporting or conveying the sulfided sorbent upwardly through the riser tube 58 to the top end of the riser tube 58 at an elevation above the upper surface of the fluidized bed 28. A suitable commercially available aspirating device (not shown) can be placed at the coupling or intersection between the stand pipe 42 and the riser tube 58 to facilitate entrainment of the sorbent 29 by the stream of regeneration gas. The stream of oxygen-containing regenerating gas is preferably air which may be mixed with a suitable diluting gas such as steam or nitrogen so as to provide the regeneration gas with an oxygen concentration in the range of about 2 to 21 volume percent. The stream of oxygen-containing regenerating gas is supplied at a flow rate to provide a quantity of oxygen that is about 0 to 4900 percent greater than stoichiometric, which is sufficient to react with essentially all the sulfur species in the sorbent 29 during passage thereof through the riser tube 58. This regeneration gas or gas mixture is also heated to a temperature in a range of from about 600° to 1400° F. and pressurized to a pressure slightly greater than that of the fuel gas in the fluidized bed 28 to assure that any pressure drop encountered in the sorbent regeneration cycle will be compensated for. As the sulfided sorbent 29 is conveyed upwardly through the riser tube 58, the oxygen in the regeneration gas exothermically reacts with the sulfur values supported by the sorbent 29 to form sulfur oxides, primarily sulfur dioxide and sulfur trioxide, while simultaneously regenerating the sorbent for reviving its capability for capturing sulfur from hot fuel gas. The exothermic, sorbent regeneration reaction is initiated upon contact with the oxygen containing gas in the riser tube 58 and this reaction actively proceeds while the sorbent is being conveyed or transported through the riser tube 58.

The time available for the regeneration of the sorbent depends upon the overall length of the riser tube 58 and the velocity at which the sorbent 29 is moved through the riser tube 58 and is typically in the range of 1.5 to 3 seconds. The reaction rate and the degree of sorbent regeneration may be readily regulated by instituting any of several controls such as achieved by adjusting the temperature to which the regeneration gas is heated, controlling the concentration of oxygen in the regeneration gas such as by regulating the volume of diluting gases added to the air, and adjusting the volume of regeneration gas introduced into the riser tube 58. The regeneration of the sorbent is usually substantially completed within a time period of about one second which is substantially less than the time available for the displacement of the sorbent 29 through the riser tube 58. When zinc ferrite particulate sorbent having an average particle size in the range of 300 to 400 microns containing 4–12 weight percent sulfur and at a temperature and pressure in the range of about 1200° to 1500° F. and 300 to 600 psig respectively, is contacted with about 450 to 1200 percent excess air relative to the stoichiometric requirements for the oxygen in the air, an air-sulfided sorbent contact duration of about one second has been shown to provide for the average regeneration of the sorbent to about 80 percent of complete regeneration. The transport times for the sorbent 29 through the riser tube 58 can be readily regulated to provide an air-sulfided sorbent contact period greater than one second to assure that the sufficient sorbent regeneration is accomplished. For example, typical tests illustrating the time factors for regenerating zinc ferrite in the aforementioned size range and sulfur content are illustrated in the table.

riser tube is pressurized to a pressure sufficiently higher than that of the fuel gas in the fluidized bed 28 to assure flow of the regenerated sorbent through the dipleg 64 into fluidized bed 28. Also, in order to prevent any entrained regeneration tail gas or reaction gases from entering the fluidized bed 28 through the dipleg 64, steam or steam in combination with another inert gas such as provided through line 46 to the stand pipe 42 may be introduced into the dipleg 64 at a plurality of vertically spaced apart locations such as provided by a manifold arrangement 66. The gases from line 46 or another suitable line enter the dipleg 64 and rise within the dipleg 64 to strip the regeneration gases and the reaction gases from the descending regenerated sorbent and displace the stripped gases upwardly into the cyclone 60 for discharge through line 62.

TABLE

| Test | Temp. (F.) | Pressure (psig) | Contact time (sec) | Sulfur in feed (Wt %) | Excess air (%) | Oxygen concen. (vol %) | Regeneration (%) Solid Basis |
|---|---|---|---|---|---|---|---|
| ZF1 | 1401 | 600 | 0.8 | 7.71 | 693 | 21 | 76 |
| ZF2 | 1410 | 298 | 0.8 | 4.08 | 1181 | 21 | 64 |
| ZF3 | 1507 | 305 | 0.8 | 4.08 | 1200 | 21 | 82 |
| ZF4-1 | 1436 | 301 | 0.8 | 9.30 | 270 | 21 | 75 |
| ZF8 | 1413 | 299 | 0.8 | 9.72 | 922 | 21 | 83 |
| ZF9 | 1367 | 298 | 0.4 | 9.72 | 2064 | 21 | 72 |
| ZF10 | 1379 | 299 | 0.4 | 9.72 | 564 | 21 | 68 |
| ZF11 | 1286 | 299 | 0.4 | 10.90 | 472 | 21 | 55 |
| ZF12 | 1357 | 299 | 0.4 | 10.90 | 426 | 21 | 58 |
| ZF13 | 995 | 299 | 1.2 | 10.90 | 907 | 21 | 0 |
| ZF14 | 1310 | 299 | 0.4 | 10.90 | 223 | 7 | 6 |
| ZF15 | 1303 | 301 | 1.2 | 10.90 | 239 | 7 | 59 |
| ZF16 | 1202 | 301 | 1.2 | 10.90 | 221 | 7 | 18 |
| ZF17 | 1197 | 300 | 1.2 | 12.10 | 447 | 21 | 82 |
| ZF18 | 1201 | 301 | 1.2 | 12.10 | 215 | 21 | 55 |
| ZF19 | 1104 | 300 | 1.2 | 12.10 | 244 | 21 | 46 |
| ZF20 | 1204 | 599 | 1.2 | 12.10 | 410 | 21 | 41 |

As generally shown in the Table the particulate sorbent will be substantially regenerated in the time frame it takes to be transported through the riser tube 58. The complete regeneration of the sorbent is not essential to the practice of the present invention since incomplete regeneration can be readily compensated for by increasing the sorbent transfer rate.

At the top end of the riser tube 58, the regenerated particulate sorbent is separated from the tail gas formed of residual regeneration gases and the gaseous sulfur oxides resulting from the desulfurization reaction by a suitable gas-solid separating device such as a cyclone 60. The regeneration gases and the sulfur oxides separated from the regenerated sorbent in the cyclone 60 are discharged from the cyclone 60 through conduit 62 at the top of the cyclone 60 for subsequent processing as briefly described above. The hot regenerated sorbent separated from the gases in the cyclone 60 enters a downwardly, preferably vertically, oriented dipleg or conduit 64 which extends from the cyclone 60 into the fluidized bed 28 to a location near the grid 24 By so placing the bottom end of the dipleg 64 near the grid 24 a solid seal is formed in the dipleg 64 with this seal is extending upwardly in the dipleg 64 to a location above the upper surface of the fluidized bed 28. The height of this seal ia dictated by the pressure drop in the sorbent regeneration loop. Normally, a pressure drop in the range of about 2 to 10 psi in the regeneration loop, including the cyclone 60, is expected to be encountered which results in the formation of a solid seal in the dipleg of satisfactory height. Inasmuch as a pressure drop in the aforementioned range is expected to be encountered, the regeneration gas introduced into the It has been found that sulfates formed in the particulate sorbent during regeneration are effectively decomposed in the fluidized bed 28 by the hot fuel gas. Thus, the practice of injecting the regenerated sorbent into the fluidized bed 28 at a location near the grid 24 is advantageous since the sulfur species released during sulfate decomposition will be given ample opportunity to react with and be captured by the sorbent in the fluidized bed 28.

The embodiment shown in FIG. 3 differs from the embodiment of FIG. 2 by enclosing the entire sorbent regeneration loop within the housing 22. This arrangement assures that the maximum heat values are retained in the sorbent as it is circulated through the regeneration loop. In such an arrangement, the riser tube 58 may be given a spiral-like configuration to assure that the riser tube 58 is of a sufficient length so that adequate sorbent transfer time is available within the riser tube 58 to achieve a satisfactory level of sorbent regeneration.

It will be seen that the present invention offers several advantages over previously known sorbent regeneration arrangements. For example, in the present invention sorbent regeneration is accomplished simultaneously with sorbent transfer through the riser tube The riser tube returns the regenerated sorbent to the fluidized bed for further sulfur capturing whereas in prior systems the sulfided sorbent was transferred to a separate regeneration vessel or the contactor was taken off line so that the sorbent could be regenerated therein. Such previous practices are relatively inefficient when compared to the efficiency of the present invention and eliminates the need for a separate regeneration vessel and associated hardware. Also, during the exothermic regeneration of the sorbent temperature control is critical since the sorbents tend to sinter and lose reactivity when over heated and thus, must be replaced by fresh sorbent. In the present invention, sorbent regeneration parameters as described above may be readily adjusted to provide a high degree of control over the temperature of the sorbent during the regeneration. This control along with the generally superior heat transfer achieved in the riser tube as compared to that achieved in fixed-, moving-, and fluid-bed contacting arrangements makes the prospect of over heating the sorbent substantially less likely. Another advantage of the present invention is that other materials may be used in the fluidized bed with the sulfur sorbent either integrally or as a mixture to simultaneously accomplish other conversions or captures of environmental contaminating species contained in the fuel gas. For example, with respect to certain gasification processes it may be beneficial to incorporate tar cracking material into the desulfurization process to increase overall sulfur removal efficiency. Any loss in cracking activity of this tar-cracking material due to the deposition of coke on the reactive surface of the tar-cracking material may be readily compensated for since the tar-cracking material may be readily reactivated by burn-off of the coke deposits during transport through the riser tube, with this burn-off occurring simultaneously with the regeneration of the sulfur sorbent.

What is claimed is:

1. A system for removing sulfur species from a stream of fuel gas produced by the gasification of sulfur-containing fuel, said system comprising a vertically oriented housing having a grid therein, a bed of particulate sulfur sorbent supported by said grid, means for directing a stream of sulfur-bearing fuel gas upwardly through the bed in the housing such that sulfur species in said fuel gas contacts said sorbent for capture thereby, vertically oriented first conduit means contacting an upper region of said bed at a location underlying the top of said bed for conveying sulfur-bearing sorbent therefrom, second conduit means in communication with the vertically oriented first conduit means at a location underlying said bed for receiving the sulfur-bearing sorbent conveyed therein, means for introducing a steam of oxygen-containing gases into said second conduit means for displacing the sulfur-bearing sorbent upwardly through said second conduit means to a preselected location with the oxygen in said oxygen-containing gases contacting the sulfur-containing sorbent and reacting with the sulfur species therein during the displacement thereof to said preselected location for converting said sulfur species to gaseous sulfur oxides and regenerating said sorbent, separating means coupled to said second conduit means at said preselected location for separating regenerated sorbent from residual oxygen-containing gas supporting said sulfer oxides, and third conduit means in communication with said separating means and a lower region in said bed for conveying the separated regenerated sorbent from said separating means into the lower region of said bed.

2. A system as claimed in claim 1, wherein gas conveying means ar coupled to said vertically oriented first conduit means at a selected location thereon for providing therein a stream of gas for removing fuel gas entrained with the sulfur-containing sorbent descending within said vertically oriented first conduit means to said bed.

3. A system as claimed in claim 2, wherein at least a portion of said third conduit means extends downwardly from said separating means, wherein said gas conveying means are coupled to said portion of said third conduit means for providing a stream of gas therein for displacing therefrom oxygen-containing gas and sulfur oxides entrained by the separated regenerated sorbent being conveyed through said third conduit means to said separating means.

4. A system as claimed in claim 3, wherein said gas conveying means are coupled to said vertically oriented first conduit means and said portion of said third conduit means at a plurality of vertically spaced apart locations.

5. A system as claimed in claim 1, wherein valve means are disposed in said vertically oriented first conduit means for controlling the rate of flow of sulfur-bearing sorbent descending therethrough.

6. A system as claimed in claim 1, wherein said second conduit means are of a sufficient size and length so that sulfur-bearing sorbent being displaced therein is contactable with an adequate volume of oxygen in the oxygen-containing gas for a sufficient duration to convert substantially all of the sulfur species contained by the sulfur-bearing sorbent to gaseous sulfur oxides.

7. A system as claimed in claim 6, wherein said preselected location is at an elevation higher than an uppermost surface of said bed.

8. A system as claimed in claim 7, wherein said separating means is disposed at an elevation higher than said bed and is positioned intermediate uppermost ends of said second conduit means and said third conduit means.

9. A system as claimed in claim 8, wherein all of said conduit and said separating means are contained within said housing means.

10. A system as claimed in claim 8, wherein an uppermost end of said vertically oriented first conduit means contacts said bed at a preselected vertical location therein, and wherein a lowermost end of said third conduit means provides for conveying the separated regenerated sorbent to a location in said bed adjacent to the grid.

* * * * *